June 11, 1935.  A. R. THOMPSON  2,004,301
FRUIT PITTING DEVICE WITH VIBRATORY PITTING MEANS
Filed Jan. 28, 1933  2 Sheets-Sheet 1

Inventor
Albert R. Thompson
By Lyon & Lyon
Attorneys

June 11, 1935.  A. R. THOMPSON  2,004,301
FRUIT PITTING DEVICE WITH VIBRATORY PITTING MEANS
Filed Jan. 28, 1933  2 Sheets-Sheet 2.
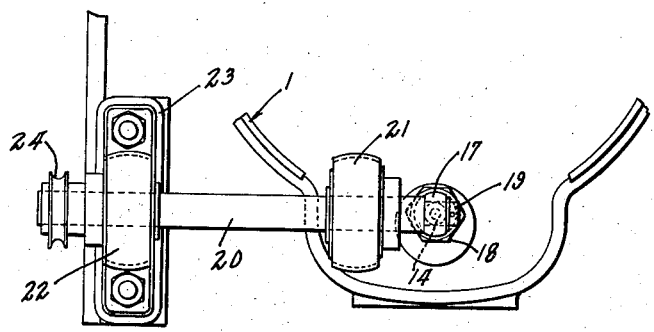
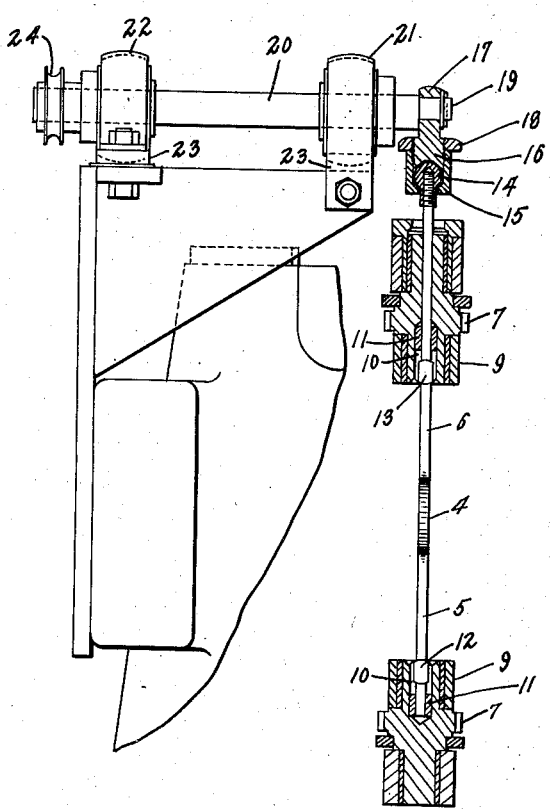
Inventor
Albert R. Thompson
By Lyon & Lyon
Attorneys Patented June 11, 1935

2,004,301

UNITED STATES PATENT OFFICE 2,004,301

FRUIT PITTING DEVICE WITH VIBRATORY PITTING MEANS

Albert R. Thompson, San Jose, Calif., assignor to Pacific Machinery Company, San Francisco, Calif., a corporation of California Application January 28, 1933, Serial No. 654,003

7 Claims. (Cl. 146—28)

This invention relates to fruit pitting devices for vibratory pitting means, and more particularly to a fruit pitting device or machine in which there is provided means for imparting a vibratory or oscillatory motion to the pitting means in order to aid the pitting means in passing over obstructions such as the fins of the pit without hanging up thereon. This invention relates particularly to an improvement in fruit pitters specifically set forth and described in my co-pending application for Fruit pitter, filed June 26, 1931, Serial No. 546,958.

In the operation of fruit pitters it has heretofore been known that in pitting devices the imparting to the pitting means of an oscillatory motion in an arcuate path following substantially the curvature of the pitting knife that a more effective removal of the pit would be provided, and that the imparting of the oscillatory or vibratory motion to the pitting blade or knife would enable the pitting knife to pass over the obstruction or fins of a peach pit, for example, without causing the knife to hang up or catch upon such obstructions.

I have found that in many forms of pitting machines such as that illustrated in my co-pending application heretofore referred to, that because of the particular construction of the pitting means it has not been deemed practical to incorporate in such a machine an oscillatory pitting knife where the knife is oscillated in a direction following substantially the curvature of the pitting knife.

I have also found that the removal of the pit from a fruit may be more effectively accomplished by imparting to the pitting knife a vibratory or oscillatory motion in the direction of the shank of the knife or the axis of rotation of the knife in that the shearing action accomplished by such vibratory action is more effectual in the making of a clean cut of the pit from the fruit and in that the knife is of a structure which permits yielding, that the yielding action of the knife when accompanied with the vibratory action thereof permits the knife to pass more closely around the flesh of the fruit and to more effectively pass over obstructions and the fins of the fruit pit without hanging up on such obstructions or fins.

It is therefore an object of my invention to provide a fruit pitting device in which there is provided a vibratory pitting means in which the pitting means is of a yieldable construction and is provided with means for vibrating or oscillating the same in the direction of the axis of rotation or movement of the pitting means in passing around the pit of the fruit.

Another object of my invention is to provide a pitting device in which there is employed a curved yieldable pitting means which is provided with means for rotating the same around the pit of the fruit in the direction of one of the axes of curvature of the pit and in which pitting device means are provided for vibrating or oscillating the pitting blade in the direction of the axis of rotation of the pitting knife.

Other objects and advantages of this invention it is believed will be apparent from the following detailed description of a preferred embodiment thereof as illustrated in the accompanying drawings:

In the drawings:

Figure 2 is a fragmental top plan view of the vibratory means provided for the pitting means.

Figure 3 is an elevation partly in section of the structure as illustrated in Figure 2.

Figure 1:
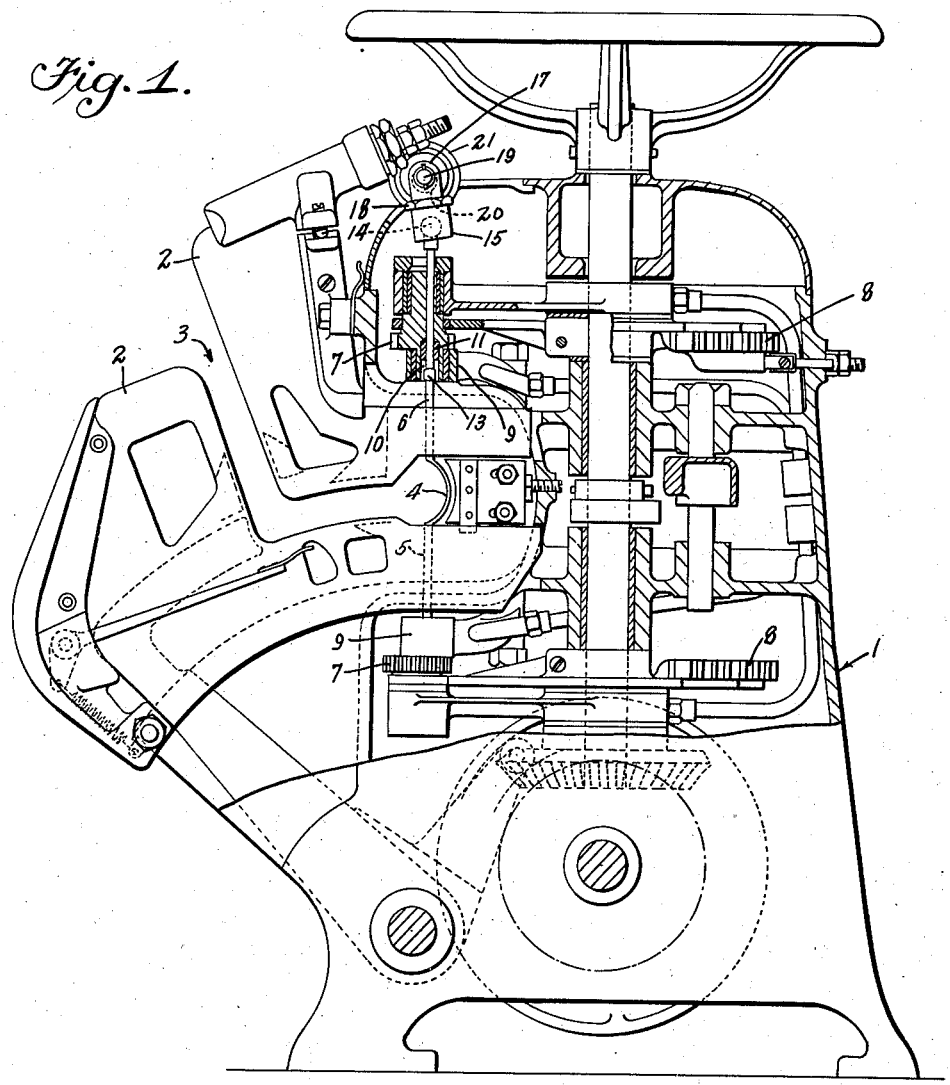
Figure 1 is a view of a pitting machine embodying my invention illustrating the oscillatory or vibratory pitting means incorporated therein.

In the preferred embodiment of my invention illustrated in the accompanying drawings, I have illustrated my invention as applied to the fruit pitting machines as specifically described in my co-pending application, Serial No. 546,958, filed June 26, 1931, entitled Fruit pitter. It is to be understood, however, that my invention is not limited to the specific machine disclosed in my co-pending application aforesaid but may be applied to any desired form of fruit pitting apparatus.

In the application of my invention as thus illustrated in the drawings, the fruit pitter is illustrated as including a frame 1 within which, or upon which, an impaling blade 2 is supported. The impaling blade 2 is formed with a pit receiving slot 3 in which a pitting knife 4 of the curved or arcuate type is mounted. The pitting knife 4 has oppositely extending shanks 5 and 6 through which the pitting knife is rotated by any suitable or desirable means such, for example, as is specifically disclosed in my copending application above referred to. The shanks 5 and 6 are supported within the bearing and drive means in such manner as to permit the oscillation or vibration of the knife in the direction of the axes of the shanks 5 and 6 on the axis around the pitting knife 4 revolves.

As illustrated in Figure 1 of the drawings, the drive pinions 7 which are secured to the shanks 5 and 6 of the pitting knife are driven by gear segments 8 which gear segments 8 may be driven in any suitable or desirable manner as specifically illustrated in said copending application. The pinions 7 are formed so as to revolve within bearing structures 9 supported by the frame 1.

In order to permit the oscillation of the pitting knife 4, the hubs of the pinions 7 are bored as illustrated at 10 and the shanks 5 and 6 of the pitting knife are mounted within sleeve members 11 mounted within these enlarged bores. In order that the pinion 7 may drive the pitting knife 4, the shanks of the pitting knife are flattened as illustrated at 12 and 13 to provide a driving contact between the pinions 7 and the shanks of the pitting knife.

During the oscillation the shanks of the pitting knife slide within the enlarged bores 10 of the pinions on the sleeve members or blocks 11. In order to impart to the pitting knife 4 an oscillatory or vibratory action as it is thus rotated in the pitting recess 3 as it passes around the pit of the fruit impaled upon the impaling blade 2, I prefer to employ the following means:

Secured to the projecting end of the upwardly extending shank 6 of the pitting knife 4 is a ball member 14 which ball 14 fits within a ball socket member 15 which is threaded to the threaded section 16 of an eccentric 17. This assembly is locked in position by means of a lock nut 18. By this means the eccentric is permitted to travel an arcuate path while the shank 6 of the pitting blade is held to movement vertically.

The eccentric 17 is mounted upon an eccentrically disposed drive pin 19 formed at the end of the eccentric shaft 20. The shaft 20 is mounted within bearings 21 and 22 held in bearing brackets 23 secured to the upper portion of the frame 1. On the projecting end of the eccentric shaft 20 there is mounted a pulley 24. The pulley 24 is driven from any suitable or desirable form of electric motor which may be mounted in any desired position, either upon the frame 1 of the fruit pitter or upon the table or disc upon which the fruit pitter may be mounted. The eccentric shaft 20 is preferably driven between 3600 to 4000 R. P. M. so that a very rapid oscillatory or vibratory movement is imparted to the pitting knife 4 as it passes around the pit of the fruit.

Having fully described my invention, it is to be understood that I do not wish to be limited to the details herein set forth, but my invention is of the full scope of the appended claims.

I claim:

1. In a fruit pitting machine, the combination of a pitting knife having oppositely extending shanks, means for rotatably supporting the shanks of the pitting knife, means for rotating the pitting knife relative to said supports, and means for reciprocating the said pitting knife with reference to said supports in the direction of its longitudinal axis as said pitting knife is rotated.

2. In a fruit pitting machine, the combination of a curved pitting knife having oppositely extending shanks, bearing means rotatably supporting the shanks, means for rotating the curved pitting knife in said bearings, and means for vibrating the curved pitting knife with reference to the bearings in the direction of the axis of rotation of the shanks of the pitting knife in said bearing.

3. In a fruit pitting machine, the combination of a curved pitting knife, spaced bearing means for rotatably supporting the curved pitting knife, means for rotating the curved pitting knife in said bearings, and means for vibrating the curved pitting knife in the direction of the axis of rotation of the curved pitting knife in rotating in said spaced bearings to reciprocate the curved pitting knife during its rotation.

4. In a fruit pitting machine, the combination of a curved pitting member formed to approximate the curve of the fruit pit in one direction, spaced bearing means for rotatably supporting the curved pitting knife, means for reciprocating the curved pitting member in the line of the axis of rotation of the pitting members in said spaced bearings, and means for rotating the pitting member in a direction substantially at right angles to the direction of vibration of the pitting member around the pit of the fruit.

5. In a fruit pitting machine, the combination of a pitting knife having oppositely extending shanks, means for rotatably supporting the shanks, an eccentric, means for connecting the eccentric with one shank of the pitting knife, and means for rotating the eccentric at a relatively high rate of speed to impart a vibratory motion to the pitting knife through the shank thereof during the rotation of the pitting knife.

6. In a fruit pitting machine, the combination of a frame, an impaling blade having a pitting recess supported by the frame upon which a fruit to be pitted is adapted to be impaled with the pit in the pitting recess, a pitting knife having oppositely disposed shanks, said pitting knife being normally supported in the plane of the pitting recess, spaced bearing means on opposed sides of said recess for rotatably supporting the pitting knife, bearing means for supporting the shanks of the pitting knife in said bearing means to permit the pitting knife to rotate within the bearings and permitting the knife to move longitudinally of the bearings, and means for imparting a rapid vibratory or oscillatory motion to the pitting knife as it is rotated.

7. In a fruit pitting machine, the combination of a curved pitting knife having oppositely extending shanks, bearing means for rotatably supporting the shanks, means for rotating the pitting knife, the shanks of the pitting knife having driving portions formed thereon to cooperate with the said means for rotating the pitting knife to cause the pitting knives to rotate as the means for rotating the pitting knife are actuated, an eccentric, means including a ball and socket joint for connecting the eccentric to one of the shanks of the pitting knife, and means for driving the eccentric at a high rate of speed to impart a vibratory motion to the pitting knife in a direction in line with the axis of rotation of the pitting knife.

ALBERT R. THOMPSON.